Aug. 2, 1955  W. SCHAELCHLIN  2,714,695
SATURABLE REACTOR MOTOR CONTROL SYSTEM
Filed Sept. 22, 1951
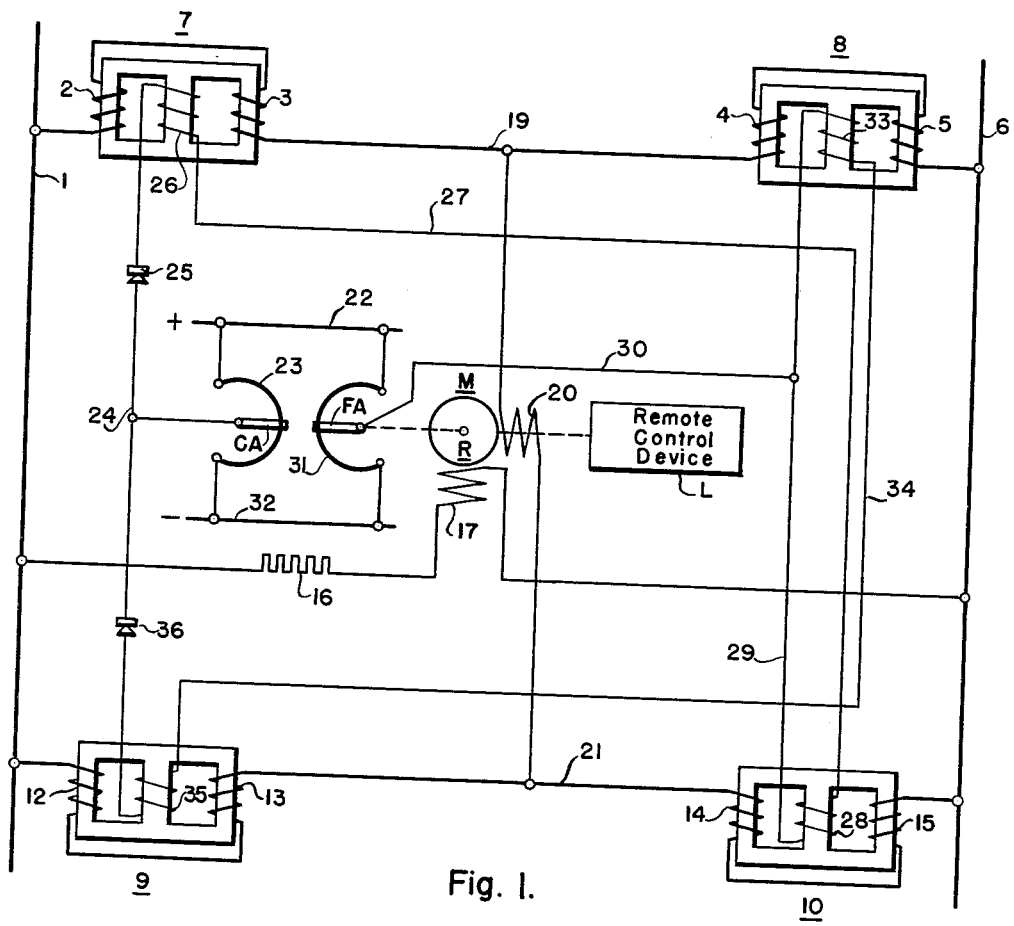
Fig. 1.
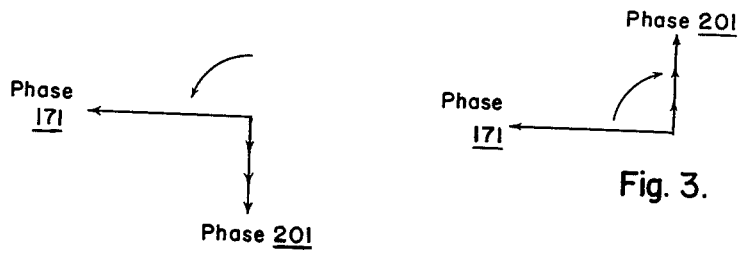
Fig. 2.
Fig. 3.
WITNESSES:
John C. Heasly
Leon J. Vaya
INVENTOR
Walter Schaelchlin.
BY
Paul C. Friedemann
ATTORNEY United States Patent Office 2,714,695
Patented Aug. 2, 1955

2,714,695

SATURABLE REACTOR MOTOR CONTROL SYSTEM

Walter Schaelchlin, Buffalo, N. Y., assignor to Westinghouse Electric Corporation, East Pittsburgh, Pa., a corporation of Pennsylvania Application September 22, 1951, Serial No. 247,813

3 Claims. (Cl. 318—29)

My invention relates to an electric follow-up system and more particularly to saturable reactor controlled electromagnetic follow-up systems.

Electric follow-up systems are well known in the prior art, however, the follow-up systems of the prior art are often not reliable, nearly always involve maintenance costs, and are always rather complex and expensive.

One broad object of my invention is the provision of an electric follow-up system that shall be simple, relatively inexpensive and involve rugged components so that maintenance costs are substantially eliminated.

A somewhat more specific object of my invention is the provision of a simple follow-up using magnetic amplifiers so controlled that a substantially stepless follow-up is provided and one that does not require contact devices and relays.

A specific object of my invention is the provision of a follow-up control using a pair of control rheostats in combination with a bridge of saturable reactors and a two-phase pilot motor so coupled that movement of the arm of one of the rheostats, the transmitting rheostat, in one or the other direction will automatically unbalance the bridge and cause rotation of pilot motor, which is coupled to the arm of the other rheostat, the follow-up rheostat, so that the position of the arm of the follow-up rheostat again matches with the position of the arm of the control or transmitting rheostat.

Other objects and advantages of my invention will become more apparent from a study of the following specification and the accompanying drawing, in which:

Figure 1 is a diagrammatic showing of my invention; and

Figs. 2 and 3 are vector diagrams of aid in disclosing my invention.

In the drawing, the device to be controlled in its movement, namely load L, is coupled to the rotor R of a two-phase motor M. The rotor R is also coupled to drive the arm FA of the follow-up rheostat 31. The rheostat 31 is connected directly across the direct current leads 22 and 32. The transmitting rheostat 23 is similarly connected to the direct current leads 22 and 32. The rheostat arms CA and FA are electrically interconnected with the control windings 26, 28, 33 and 35, of the saturable reactors 7, 10, 8, and 9, respectively. The main or alternating current windings 2 and 3, and 4 and 5, of the saturable reactors 7 and 8, respectively, are connected directly across the alternating current supply leads or buses 1 and 6 as shown.

The alternating current windings 12 and 13, and 14 and 15 of the saturable reactors 9 and 10, respectively, are also connected directly across the alternating current supply buses 1 and 6. It will be noted that the circuit including the resistor 16 and one of the phases, represented by the motor winding 17, is connected directly across the supply leads 1 and 6 so that the power factor of this winding 17 is relatively high. The other motor winding, i. e., the control winding 20 is connected across the leads 19 and 21 between the saturable reactors 7 and 8, and 9 and 10, respectively. The current thus flowing in winding 20 is lagging by about 90° or 270° depending on the character of the reactor unbalance, and the motor, therefore, will develop a good torque as long as the bridge circuit is unbalanced. The legs of the bridge are, of course, the windings 2 and 3 of reactor 7, windings 4 and 5 of reactor 8, windings 12 and 13 of reactor 9, and windings 14 and 15 of reactor 10.

The energizing circuits for the control windings, or coils of the saturable reactors may be traced from the positive conductor 22 through the upper portion of the transmitting potentiometer 23, the control arm CA, lead 24, rectifier 25, direct current control winding 26, lead 27, direct current control winding 28, leads 29 and 30, follow-up arm FA of the potentiometer 31, to the negative conductor 32.

The other control circuit may be traced from the positive conductor, or lead 22, through the upper portion of the rheostat 31, the arm FA of the potentiometer 31, leads 30 and 29, control winding 33 of reactor 8, lead 34, control winding 35 of reactor 9, rectifier 36, lead 24, the arm CA of the control potentiometer 23, through the lower portion of potentiometer 23, to the negative conductor 32.

From the circuits traced for the control windings 26, 33, 28 and 35, it is apparent that when the follow-up arm FA matches the position of the control arm CA so that the bridge is balanced, no current flows in the control windings. However, when the control arm is moved to unbalance the potentiometer resistor bridge, then the reactor bridge becomes unbalanced. For example, if the control arm is moved counterclockwise to make the lead 24 more positive than the lead 30, then control windings 26 and 28 carry a saturating current. The impedance of reactors 7 and 10 is decreased and an energizing current flows from the lead 1, through the windings 2 and 3, the lead 19, the phase winding 20 of the two-phase motor M, lead 21, and windings 14 and 15 to the lead 6.

For the operation assumed, the current in phase 201 lags the current in phase 171 by 270°, see Fig. 2. The motor will thus run in the direction to rotate the follow-up arm FA clockwise to again balance the potentiometer bridge and in consequence match the reactor bridge.

When the control arm CA is moved clockwise, the control windings 33 and 35 carry current to decrease the impedance of the reactors 8 and 9. The result is that the phase position of the current in phase winding 201 is now as shown in Fig. 3. The motor M will now run to move the follow-up arm FA counterclockwise to place the arm FA in position to match the position of CA.

The arm CA may be manually operable or may be coupled to some apparatus providing an automatic operation of the arm CA in accordance with the kind of follow-up that the load L is to effect.

While I have shown but a single embodiment of my invention, I do not wish to be limited to such single embodiment because modifications may very likely be made by others skilled in the art, particularly after having had the benefit of the teachings of my disclosure, without departing from the spirit of my invention.

I claim as my invention:

1. In an electric control system, in combination, a pair of alternating-current terminals supplied with alternating current, an alternating-current motor having two primary windings and a rotor, one of the primary windings being connected to the said terminals to be energized with alternating current, four reactors comprising a first, a second, a third, and a fourth reactor each having an alternating-current winding and a direct-current winding for altering the impedance of the reactors, the alternating-current windings of the first and second reactor being connected in series to said terminals and the alternating-current windings of the third and fourth reactors being connected in series to said terminals, the second primary winding of said motor being connected across the connection between the alternating-current windings of the first and second reactors and the third and fourth reactors, whereby the secondary primary winding of the motor may be selectively energized with zero value of alternating current when the impedances of the reactors are balanced, with an alternating current that lags the current in the first primary winding by ninety electrical degrees when the impedance of one pair of reactors is increased, and with an alternating current that lags the current in the first primary winding by two hundred seventy electrical degrees when the impedance of the second pair of reactors is increased, and means for energizing the direct-current windings of the reactors to alter the impedances of the reactors.

2. In an electric system of control, a reactor bridge circuit having two input terminals and two output terminals with reactor coils in each of the legs of the bridge, an alternating-current motor having two energizing windings with one winding being connected across the input terminals of the reactor bridge circuit and the other connected across the output terminals of the reactor bridge circuit, a pair of potentiometer circuits each connected to be energized at a given direct current voltage, an adjustable control lead operable to contact at any point on one of the potentiometer circuits to thus be subject to any selected direct-current voltage, a follow-up lead coupled to be driven by said motor, said follow-up lead being operable by said motor to contact at any point on the second potentiometer a reactor saturating direct-current circuit including in series a rectifier, a reactor saturating coil for the reactor coil connected between the first input terminal and the first output terminal of the reactor bridge circuit, and a reactor saturating coil for the reactor coil connected between the second output terminal and the second input terminal of the reactor bridge circuit, said reactor saturating direct-current circuit being connected from the control lead to the follow-up lead with the rectifier being connected in the sense that current can flow only from the control lead to the follow-up lead, a second reactor saturating direct-current circuit including in series a reactor saturating coil for the reactor coil connected between the second input terminal and the second output terminal of the reactor bridge circuit and a second reactor saturating coil for the reactor coil connected between the second output terminal and the first input terminal of the reactor bridge circuit, and rectifier, said second reactor saturating direct-current circuit being connected from the follow-up lead to the control lead with the rectifier being connected in the sense that current can flow only from the follow-up lead to the control lead, whereby movement of the control lead unbalances the reactor bridge to cause the motor to move the follow-up lead to rebalance the reactor bridge.

3. In a control for a split-phase alternating-current motor having a pair of field windings, the combination of, four saturable reactors each having a primary winding and a secondary winding, an alternating-current bridge circuit having input terminals and output terminals and including the secondary windings in four separate legs of the bridge circuit, two circuit means connecting in series circuits the primary windings associated with each of the diagonally disposed legs of the bridge circuit, a rectifier connected in series with each series-connected pair of primary windings, second circuit means connecting the series circuits in parallel circuit relation, the rectifiers being oppositely poled in the series circuits, circuit terminals for applying reversible direct current across the parallel circuit, one of said field windings being connected to said input terminals and the other of said field windings being connected to said output terminals.

References Cited in the file of this patent

UNITED STATES PATENTS

| | | |
|---|---|---|
| 2,363,342 | Lesnick | Nov. 21, 1944 |
| 2,518,865 | Cartotto | Aug. 15, 1950 |

OTHER REFERENCES

"Servomechanism Fundamentals," Lauer, Lesnick and Matson, McGraw-Hill Book Co., 1947, pp. 248–256.